Feb. 7, 1961    R. V. JUDY    2,971,061

TELEPHONE ANSWERING SERVICE SYSTEM

Filed April 28, 1958    5 Sheets-Sheet 1

R. V. JUDY

Feb. 7, 1961 R. V. JUDY 2,971,061
TELEPHONE ANSWERING SERVICE SYSTEM
Filed April 28, 1958 5 Sheets-Sheet 3
FIG. 3 PART I
TRUNK EQUIPMENT TE-1
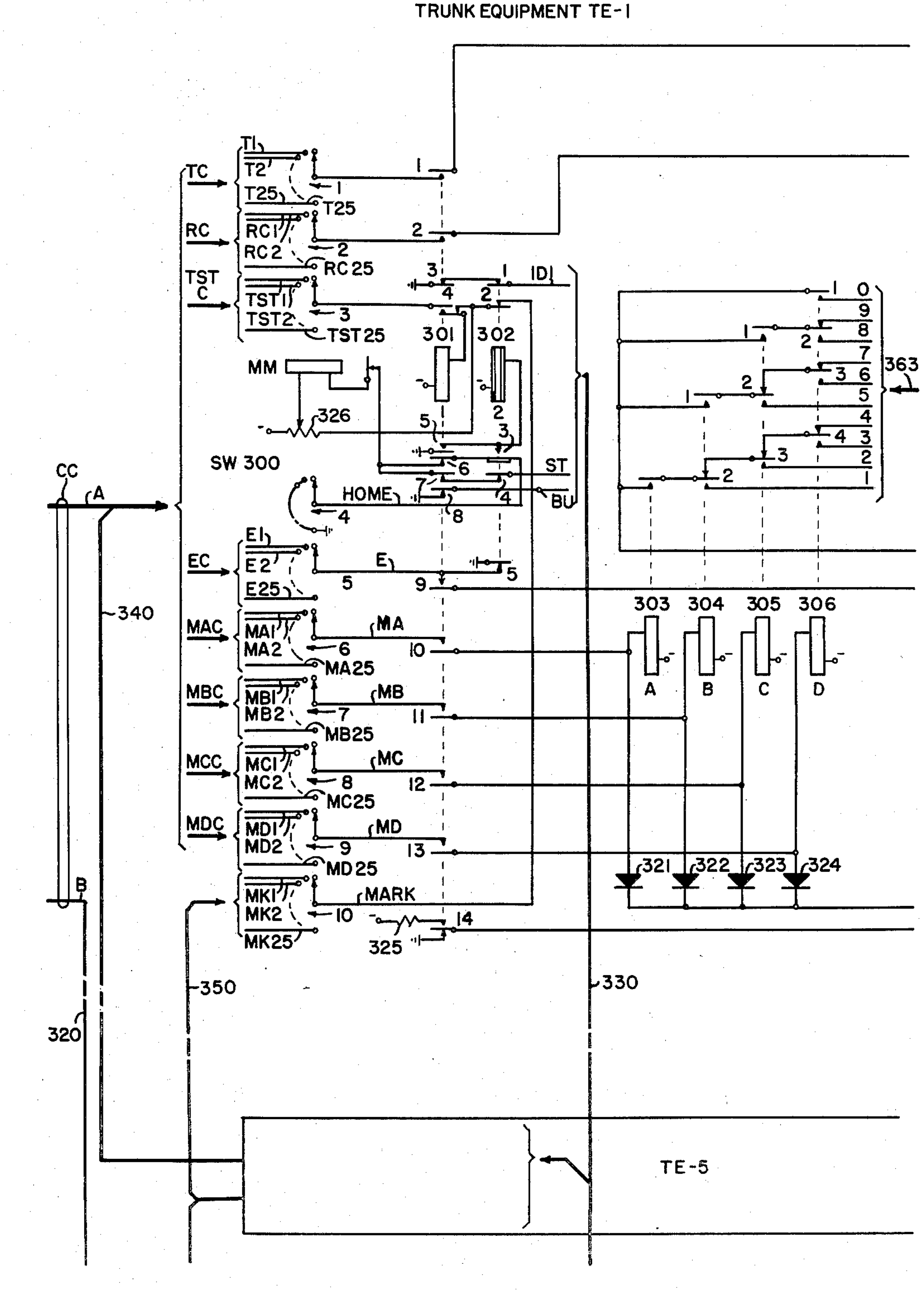

FIG. 3 PART 2
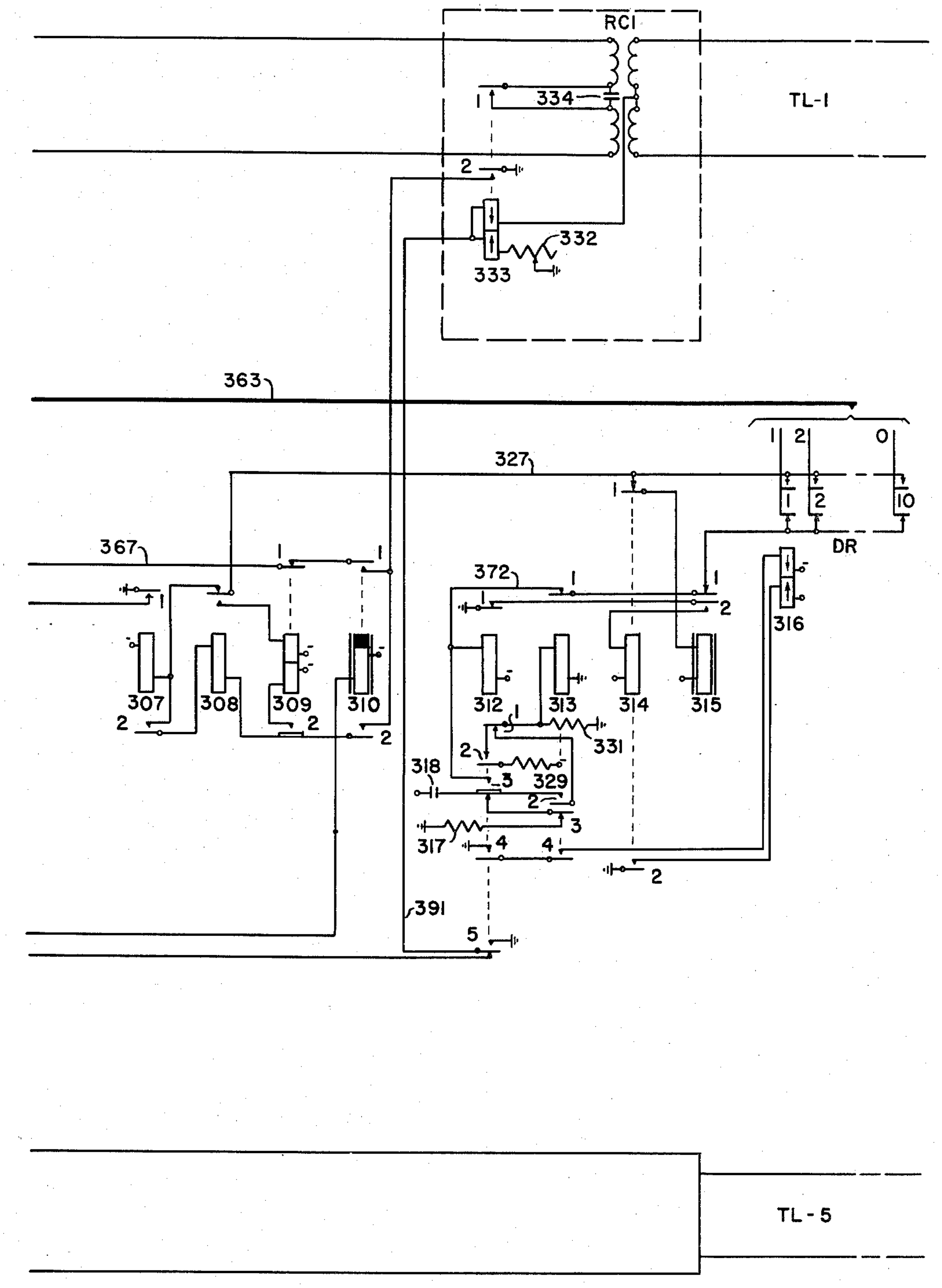

Feb. 7, 1961 R. V. JUDY 2,971,061

TELEPHONE ANSWERING SERVICE SYSTEM

Filed April 28, 1958 5 Sheets-Sheet 5

TRUNK AND POSITION EQUIPMENT

OPERATOR CORD OC

| | A | B | C | D |
|---|---|---|---|---|
| 1 | X | X | | |
| 2 | X | | X | |
| 3 | X | | | X |
| 4 | X | | | |
| 5 | | X | X | |
| 6 | | X | | X |
| 7 | | X | | |
| 8 | | | X | X |
| 9 | | | X | |
| 0 | | | | X |

United States Patent Office 2,971,061

Patented Feb. 7, 1961

2,971,061

TELEPHONE ANSWERING SERVICE SYSTEM

Robert V. Judy, Chicago, Ill., assignor to International Telephone and Telegraph Corporation, New York, N.Y., a corporation of Maryland Filed Apr. 28, 1958, Ser. No. 731,282

6 Claims. (Cl. 179—27)

This invention relates to a telephone answering-service system wherein participating subscribers, during absences from their telephones, may have all incoming telephone calls handled by a secretarial agency which receives and delivers message for such subscribers. Its principal object is to provide a new and improved system of the above character wherein the selection between calls handled by the participating subscriber and calls handled by the answering-service company is automatically controlled.

In known telephone answering-service systems, it is common practice for the participating subscriber to designate the particular hours when answering service is to be effective and to notify the answering-service agency of any variations therefrom. This requires reporting of each unusual or unexpected departure of the participating subscriber from his office or home and each subsequent return thereto, together with the consequent altering of the schedule of the answering-service agency, has greatly lessened the attractiveness of telephone secretarial service.

An object of this invention is to provide a telephone answering-service system wherein the answering-service company need not be notified of each absence and subsequent return of the subscriber. This is accomplished by arranging the answering-service equipment to intercept all incoming calls to each participating subscriber line, but to delay the intercepting operation for a predetermined time after the subscriber is first signalled. Such an arrangement insures reliable answering service during each absence of the participating subscriber without imposing any notification requirement thereon.

Another object of the invention is to provide a telephone answering-service system wherein the participating subscriber may assume exclusive control over any call which is being handled by the answering-service agency.

Still another object is to provide a simplified and improved line-identifying and register-sender arrangement for automatically informing the answering-service agency of the identity of the participating subscriber to whom the call is directed.

The above mentioned and other features and objects of this invention and the manner of attaining them will become more apparent and the invention itself will be better understood by reference to the following description of an embodiment of the invention taken in conjunction with the accompanying drawings comprising Figs. 1 to 8 wherein:

Fig. 1 discloses a single-line call-through diagram of the telephone answering-service system;

Fig. 2 shows in circuit detail, the call-detecting equipment associated with a participating subscriber's line;

Fig. 3, parts 1 and 2, disclose a circuit diagram of trunk equipment individual to the trunk line extending between the exchange equipment and the answering-service switchboard;

Fig. 4 discloses a circuit diagram of a call-allotter for handling the answering-service calls on a one-at-a-time basis;

Fig. 5 discloses a circuit diagram of a trunk allotter for allotting an idle one of the trunk equipments to the call-detector having an answering-service call thereon;

Fig. 6 discloses a circuit diagram of the trunk and position equipment located at the telephone answering-service agency's premises;

Fig. 7 discloses a chart showing the code combinations corresponding to the assignable digit values 0 to 9; and Fig. 8 discloses the manner in which the drawings should be arranged in order to be best understood.

GENERAL DESCRIPTION

Referring now to Fig. 1 of the drawings, the system there disclosed comprises central office equipment 10, answering-service exchange equipment 20, and answering-service switchboard equipment 30. Equipment 30 is connected to the exchange equipment 20 by trunk lines TL–1 to TL–5.

When a subscriber such as S1 desires answering-service facilities, the answering-service company is notified over line LX in the conventional manner. In response to such notification, the answering-service company jumper-connects the central-office line equipment of such subscriber to the answering-service exchange equipment 20 by jumpers in group J201, and an identifying code, such as "65," is assigned to such line for identification purposes.

When the participating subscriber S1 originates a call, a connection is extended through line circuit LC1, line-finder equipment LF, and connector equipment CONN to the desired called subscriber, all in the well-known manner. The answering equipment 20 is so arranged that it will not respond to such originating calls.

On incoming calls from a station, such as S9, to a station subscribing to answering-service facilities, a connection is extended to the subscriber's line from connector CONN in the normal manner and ringing current is then placed on the called line, signalling the subscriber's telephone.

In the event that the called subscriber, such as S1, does not answer the call within a predetermined delay period, a call-detector, such as CD1 of equipment 20, detects the call and hunts, by operation of switch SW–200–1, for the first idle one of a maximum of 25 links in cable group CC–A extending to trunk equipments TG–1 to TE–5.

When CD1 finds an idle link, a link-identifying wire is marked in cable CC–B and call-allotter CA is seized, when idle, over a separate conductor MOP in such group.

Call-allotter CA, after seizure, is temporarily individualized with CD1 and is caused to hunt, by operation of switch SW–400, for the marked link-identifying wire in group CC–B. When such wire is found, a corresponding link-identifying wire in cable 350 is marked.

Responsive to the seizure of call-allotter CA, trunk allotter TA is seized and caused to hunt, by operation of switch SW–500, for an idle one of five test wires (in cable 330) corresponding respectively to trunk equipments TE–1 to TE–5.

Assuming trunk equipment TE–1 to be idle, trunk allotter TA, after selection and seizure of such trunk, causes it to hunt, by operation of switch SW–300, for the marked link-identifying wire in cable 350. When such wire is found, CD1 is connected to TE–1, as both are positioned on the same link. At such time, the line associated with called station S1 is connected to trunk line TL–1, associated with equipment TE–1.

Responsive to the interconnection of trunk equipment TE–1, and call-detector CD1, the operator at the answering-service equipment 30 is signalled over trunk line TL–1 and associated trunk position equipment TPE–1. The operator, by usual cord operation, answers the call and operations occur in trunk equipment TE–1 to cause the identity of the intercepted line to be transmitted to the answering-service operator. After receipt of such identification, the operator receives or delivers any desired messages.

If the operator desires a verification of the line identification, a key at the switchboard is operated which causes the code to be re-sent. Also, in the event the subscriber returns while the connection is being handled by the answering-service operator, removal of the handset at station S1 automatically connects the subscriber to the calling party and releases the answering-service connection.

DETAILED DESCRIPTION

Figures 4, 5:
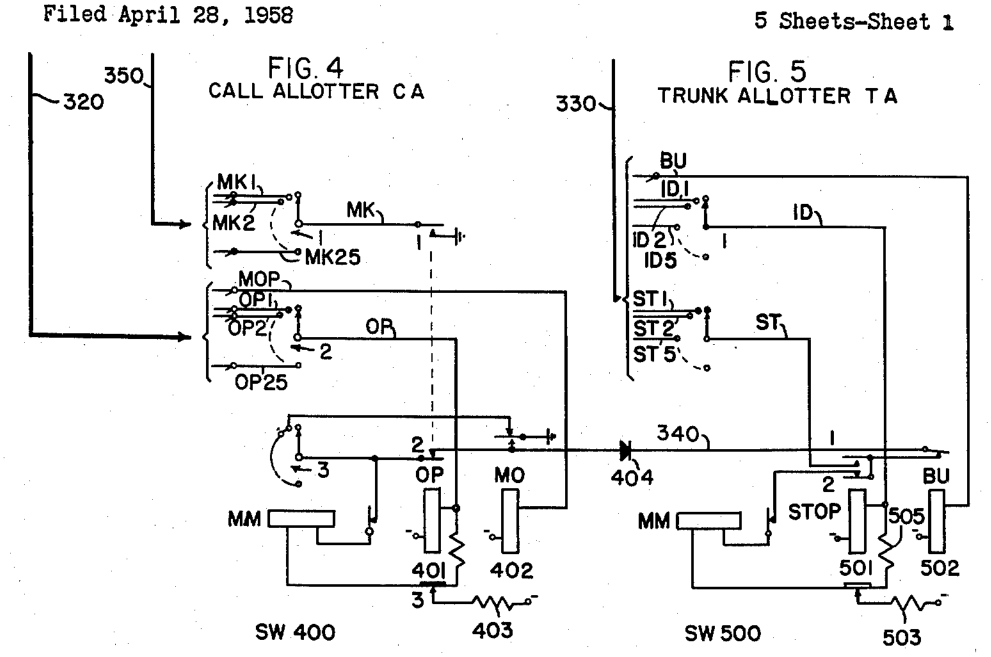
Figures 1, 8:
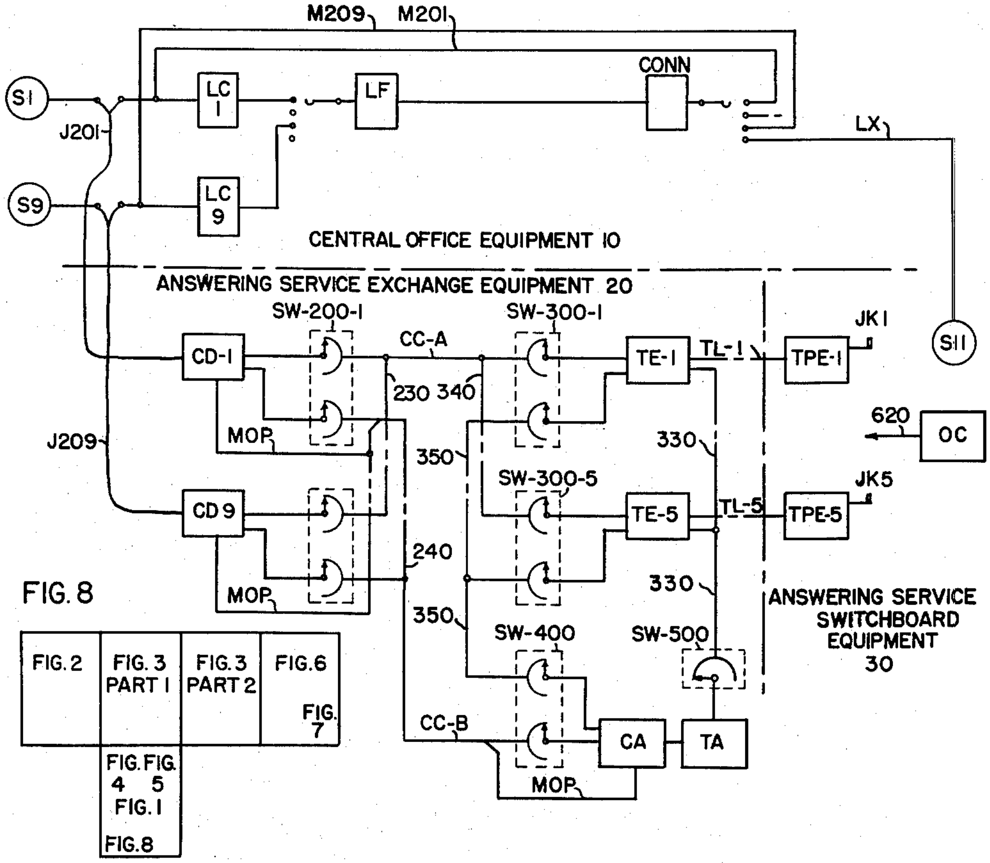

Referring now in particular to Figs. 2 to 7, the operation of the system in handling calls will be described in detail.

*Originating call*

When the subscriber at station S1 originates a call, relay 201, connected in series with one of the line conductors, operates. Contacts on relay 201 open the operate circuit of start relay 203 and disable call detector CD1 from initiating answering service. The calling subscriber thereafter dials the desired party and is connected thereto in the well-known manner. Throughout the duration of such connection, relay 201 is held operated, its winding being bridged by condenser 213 to enhance conversation.

Disconnect by the calling subscriber results in the restoration of relay 201 and the reclosing of a point in the operate circuit of start relay 203.

*Detection of incoming call (Fig. 2)*

On an incoming call to station S1 from a station such as 9, ground is projected forward on the sleeve conductor S of multiple M201 and is extended over jumper J4 of group J201 to the battery-connected winding of start relay 203.

Relay 203 operates and completes an operate circuit for delay relay 202. Shortly thereafter, ringing current is placed on the subscriber's line from the calling connector to signal the called station S1. This ringing current passes through series line relay 201, but relay 201 is not thereby operated, because of its adjustment and of its indicated copper-sleeve construction.

In the event that the call is not answered within 15 seconds, for example, as determined by the slow-operate characteristics of delay relay 202, relay 202 operates. Contacts on relay 202 extend ground over wire 230 to relay 207 and also through bank contacts of switch SW-200, over wire TST, and through switch SW-200 interrupter contacts of motor magnet MM. Relay 207 does not operate as it has ground on both sides of its winding.

Magnet MM operates and causes each of the brushes of SW-200 to advance one step to make contact with the wires in link 1 of group CC-A.

As noted, group CC-A includes 25 links interconnecting call-detectors CD1 to CD9 with trunk equipments TE-1 to TE-5. Link 1 includes the eight wires T1, R1, . . . and MD1, while link 2 includes wire T2, R2, . . . and MD2.

If any link is busy from seizure by a call detector, ground appears on the corresponding test wire TST from ground at make contacts 3 of relay 207 of the busy detector. If such link is idle, the corresponding one of the test wires TST1 to TST25 is ungrounded.

Assuming link 1 to be busy from seizure by a call detector other than CD1, ground is present on test wire TST1, which ground is extended through brush TST of SW-200 when it's in position 1, through break contacts 3 of relay 207 and rectifier 211 to one side of the winding of relay 207 and also to motor magnet MM through the noted interrupter contacts. With ground still appearing on both sides of relay 207, it fails to operate, but motor magnet MM, in response to the ground on wire TST1, causes SW-200 to advance its brushes another step to link 2.

Assuming link 2 to be idle, no ground appears on test wire TST2 and relay 207 operates in series with motor magnet MM. Switch SW-200 does not advance any further as the current through relay 207 is insufficient to operate it. Contacts 3 of relay 207 open the initial operate circuit of magnet MM and ground test wire TST2 to mark it busy to all other call-detectors. Contacts 9 of relay 207 ground wire MOP in cable group CC-B and also places a marking ground on the link-identifying wire OP2 of group CC-B.

*Call allotter (Fig. 4)*

The ground on wire MOP is extended to the battery-connected winding of relay 402 of call-allotter CA (Fig. 4) independently of switch SW-400.

Relay 402 operates and extends ground to motor magnet MM of switch SW-400 and to wire 340 through rectifier 404.

Switch SW-400 advances its brushes step-by-step causing brush OP to engage wires OP1 to OP25 successively until the marked link-identifying wire in CC-B is found. When brush OP engages wire OP1, no switch-stopping operation occurs as wire OP1 is open. Accordingly, switch SW-400 advances its brushes another step, causing brush OP to engage wire OP2. Since wire OP2 is marked, the ground thereon from detector CD1 reduces the current flow through magnet MM to a value such that switch SW-400 is prevented from advancing further. The ground on wire OP2 also energizes relay 401.

Relay 401 operates; opens the operate circuit of switch SW-400; and grounds link-identifying wire MK2 of cable group 350. Switch SW-400 remains in position 2.

*Trunk allotter (Fig. 5)*

If any trunk equipment (Fig. 3) is idle, ground from contacts 8 of relay 301 of such idle trunk equipment is present on the common busy wire BU which will maintain relay 502 in an operated condition. Also, ground from contacts 3 of relay 301 is present on the associated idle wire, such as wire ID1 of trunk equipment TE-1. Thus, when any trunk equipment is idle, relay 502 is in an operated condition from the grounded wire BU and the ground on wire 340 from allotter CA is extended to motor magnet MM of switch SW-500. SW-500 thereupon advances its brushes step-by-step until brush ID engages a grounded one of the wires ID1 to ID5.

Assuming trunk equipment TE-1 is idle, the ground on wire ID1 is extended over group 330 and through brush ID to the battery-connected winding of relay 501. This ground also reduces the current flow through magnet MM to a value such that switch SW-500 is prevented from advancing further.

Relay 501 operates; opens the initial operate circuit of switch SW-500; and, at contacts 1, grounds start wire ST1 extending to motor magnet MM of SW-300 of the idle trunk equipment TE-1.

*Trunk equipment seizure*

Referring now to Fig. 5, switch SW-300 advances its brushes step-by-step in search of ground on link-identifying wire MK2 of group 350. Its operate circuit is from ground on wire ST1, contacts 4 of relay 302, contacts 7 of relay 301 and the switch interrupter contacts.

When switch SW-300 advances to position 1, its brush MARK engages wire MK1. At such time no switch-stopping operation occurs as wire MK1 is open. Accordingly, switch SW-300 advances its brushes another step, causing brush MK to engage ground-marked wire MK2. The ground on link-identifying wire MK2 is thereupon extended to the battery-connected winding of relay 301 and to resistor 326 which reduces the current flow through magnet MM to a value insufficient to cause further advance of switch SW-300.

Figure 2:
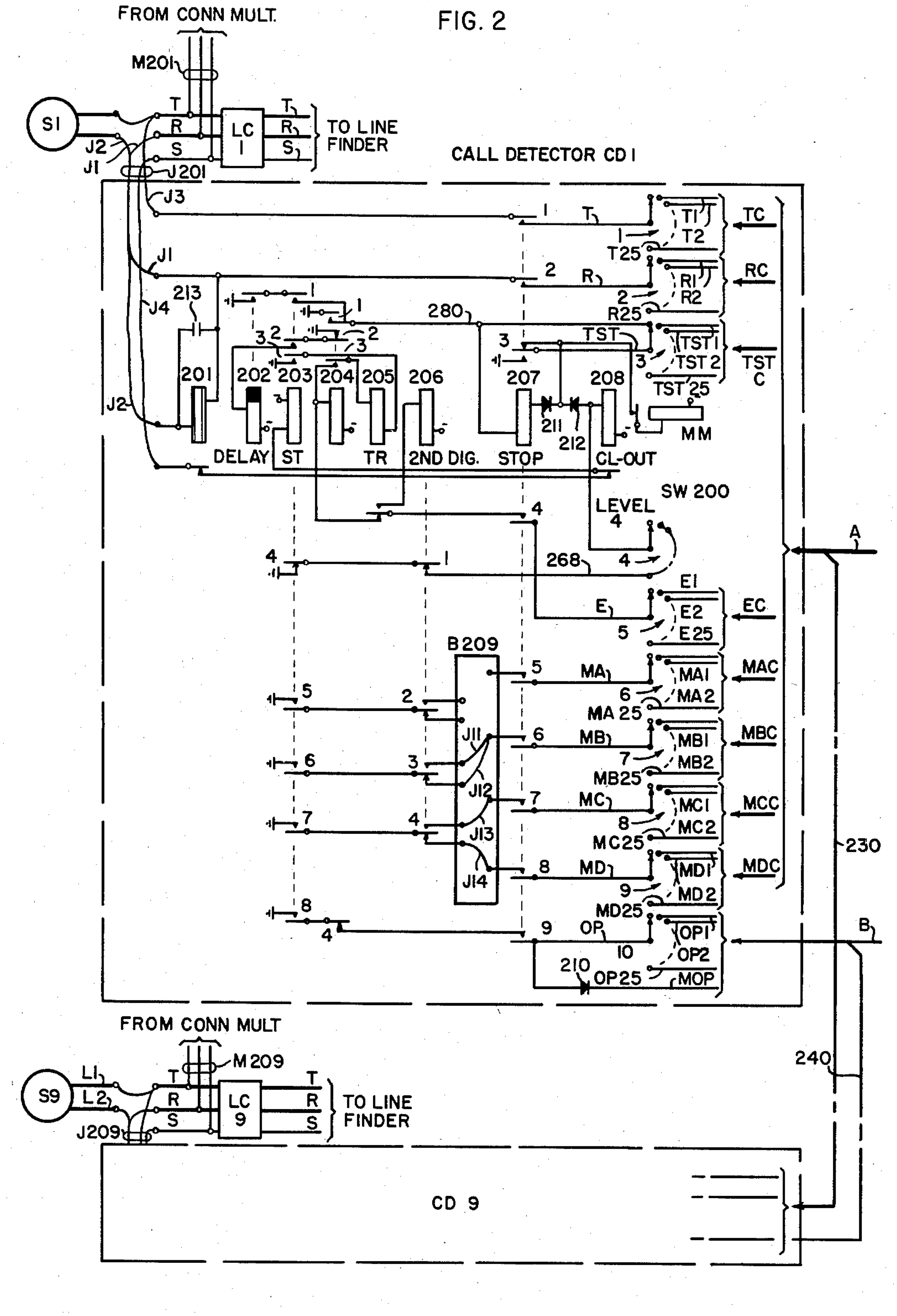

Relay 301 operates and locks operated through its make contacts 4 to the ground on test wire TST2 which appears thereon from make contacts 3 of relay 207 (Fig. 2). Contacts 5 of relay 301 extend ground to relay 302; contacts 3 remove ground from wire ID1 releasing trunk allotter TA; contacts 7 open the start wire ST; contacts 10 through 13 connect the code wires MA to MD to corresponding relays 303 to 306; contacts 14 extend battery through resistor 325 to signal relay 333; and contacts 1 and 2 complete a portion of the talking circuit.

At such time, call detector CD1 is connected to trunk equipment TE-1 over the wires in link 2.

Relay 204 of CD1 operates from the ground appearing on wire E, from contacts 5 of relay 302. Contacts 4 of relay 204 remove ground from wire MOP to release allotter CA and contacts 2 open-circuit delay relay 202. The ground on wire E is also extended to one side of relay 205 which cannot operate as it has ground also appearing on the other side thereof.

Relay 302 operates thereafter and removes ground from wire E which removes the shunt from relay 205, permitting it to operate in series with operated relay 204 from ground at contacts 3 of relay 203. Contacts on relay 205 prepare an operate circuit for relay 206 which will be completed when ground reappears on wire E.

When ground is removed from wires MOP and Op2, relays 401 and 402 restore, leaving switch SW-400 positioned on wires corresponding to link 2. On the next succeeding intercepted call, switch SW-400 will advance to position 3 and so on to alter the preference of call-detector seizures.

When ground is removed from wire ID1, relay 501 restores, reclosing the operate circuit for magnet MM of switch SW-500. SW-500 will remain in position 1 until the next call causes it to advance in search of the next idle succeeding trunk equipment.

*Seizure of trunk and position equipment*

Figure 7:
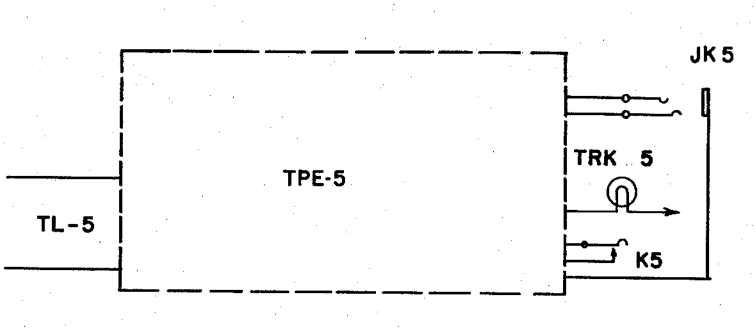

As hereinbefore noted, station S1 is assigned code identification number 65, and jumpers J11, J12, J13 and J14 are connected on jumper board B209 for such code as set forth in the chart shown in Fig. 7.

For the digit 6, wire MB and MD, corresponding to relays B and D are jumper-connected to ground at contacts on relay 203 by jumpers J12 and J14 on board B209, and for digit 5, wires MB and MC are similarly jumper-connected by jumpers J11 and J13. The selection between the above pairs of jumpers for corresponding digits is controlled by relay 206. Thus, responsive to the operation of relay 301, the ground on wires MB and MD is extended to the battery-connected winding of code relays 304 and 306, causing them to operate. At the same time, this ground is projected forward through rectifiers 322 and 324 to the battery-connected winding of slow-operating relay 310, which operates and connects wire 367 to open contacts on signal relay 333.

The battery potential appearing on wire 391, from resistor 325, is extended through the lower winding of signal relay 333 to ground through resistor 332 and through the upper winding of relay 333, the secondary winding of repeat coil RC-1, trunk line TL-1, and the upper winding of relay 633 (Fig. 6) to ground at contacts of relay 602.

Relay 633 operates as its lower differentially connected winding is short-circuited, but relay 333 does not operate as both its opposing windings are energized. This type of signalling is well-known in composite signalling trunk terminating equipment.

Contacts on signal relay 633 light the trunk call lamp TRK-1 to signal the operator that a call is waiting.

*Operator answer (Fig. 6)*

Responsive to the lighting of the call lamp, the operator connects cord circuit OC with trunk and position equipment TPE-1 by inserting plug P1 in jack JK1, thereby bridging the battery and ground connected windings of relay 601.

Relay 601 operates and extends ground from contacts of relay 633 to the battery-connected winding of relay 602 and to the battery-connected winding of relay 605. Relay 602 operates and replaces the ground appearing on the upper winding of signal relay 633 with battery from resistor 615. At the same time, trunk lamp TRK-1 is extinguished. Signal relay 633 does not restore at this time as its lower winding is maintained energized with the upper winding thereof short-circuited. Relay 605 operates and operates relays 606 and 607 sequentially in preparation for receiving the pulses corresponding to the code (65) assigned to the intercepted station.

*Ring-trip and transmission of code pulses*

Responsive to the transmission of battery potential over trunk line TL-1 as a result of the operation of relay 602, battery potential appears on both sides of the upper winding of relay 333, short-circuiting such winding. Current flow through the lower winding of relay 333, without any opposing flux from its upper winding, causes relay 333 to operate. Contact 1 of relay 333 shunt condenser 334 to close a direct-current answering bridge across the conductors of the called line, through the associated windings of RC1, contacts 1 and 2 of relay 301, brushes 1 and 2 of SW-300 and their engaged conductors of groups TC and RC, brushes 1 and 2 of SW-200, contacts 1 and 2 of relay 207, and conductors J3 and J1 of jumper J201. Closure of this bridge causes the usual ring-trip operation to occur in the calling connector, but series line relay 201 is not now operated since it is excluded from the traced answering bridge closed by 333.

Contacts 2 of relay 333 extend ground potential over wire 367 and through the contacts of operated code relays 304 and 306 to output wire 6. This ground is extended through break contacts 6 (not shown) of digit register DR and over wire 372 to the winding of relay 312.

Relays 312 and 313 comprises a two-relay pulse generator which, as long as wire 372 is grounded, generates pulses of a length and frequency determined by the RC characteristics of condenser 318 and the windings of relays 312 and 313. Contacts 5 of relay 312 generate ground and battery impulses which are registered in the operator's cord circuit while contacts 4 of relay 313 generate ground pulses which advance digit register DR step-by-step. Since start wire 372 is controlled through contacts on DR, pulses generated by relays 312 and 313 will correspond in number to the contact set number associated with a grounded digit wire.

Relay 312 operates from the ground on wire 372; contacts 2 thereon connect battery through resistance 329 to the ground-connected winding of relay 313; and contacts 3 connect charged condenser 318 to wire 372, condenser 318 being in a charged condition from ground through resistor 317.

Relay 313 operates; its contacts 1 remove ground from wire 372; and its contacts 2 prepare a temporary holding circuit for itself. With ground removed from wire 372, condenser 318 becomes short-circuited (battery potential on both plates) and discharges through the winding of relay 312. This discharge current maintains relay 312 operated.

Relay 312 restores when condenser 318 becomes discharged and contacts thereon open the original operate circuit of relay 313 and transfer condenser 318 from the winding of relay 312 to relay 313. Condenser 318 now charges, the charging current flowing through the winding of relay 313, maintaining it operated.

Relay 313 restores when condenser 318 becomes recharged and contacts thereon reclose the ground on wire 372, to start another pulse cycle. Contacts 5 of relay 312 have generated one pulse which, as will be described hereinafter, is transmitted to the operator's cord circuit and contacts 4 of relay 313 have generated one pulse which advanced the first contact set of DR one step.

The above cycle is repeated until the number of pulses generated corresponds to the contact set of DR terminating the digit wire which was grounded by the code relays.

When the contact set of DR corresponding to the marked digit wire is operated, the ground thereon is extended through make contacts 6 (not shown) of register DR to relays 315 and 307.

Relay 315 operates; prepares an operate circuit for relay 314; and removes the ground wire 372 to prevent reoperation of relay 312 when relay 313 releases after condenser 318 is again recharged.

Relay 314 operates; its contacts 2 energize the release winding of DR, causing all the contact sets thereon to return to normal; and its contacts 1 open the operate circuit of relay 315 which restores after a delay of sufficient duration to permit register DR to restore.

Relay 307 operates; prepares an operate circuit for relay 308; and closes an operate circuit for relay 206 over wire E2 in cable group CC–A.

Relay 206 operates and opens the initial operate circuit of the code relays corresponding to the first digit code and closes an operate circuit for the code relays corresponding to the second digit code. Accordingly, ground is extended over jumpers J11 and J13 to complete an operate circuit for code relays 304 and 305 (relays B and C). Relay 310 remains operated during this change-over time.

Relay 308 operates when DR restores and removes ground from wire 327 as an operate circuit is completed through relays 307 and 308 in series. Contacts on relay 308 prepare an operate circuit for relay 309, which will be completed when wire 327 is again grounded.

Code relays 304 and 305 operate and ground code wire 5.

When relay 315 restores, it restores relay 314. Contacts on relay 315 extend the ground on code wire 5 to relay 312 and the pulse generator functions as before to generate a series of impulses (5) constituting the second digit of the code assigned the intercepted station.

When DR advances to its fifth position, relay 315 and 314 are operated as before to stop the pulses. However, ground is now extended to relay 309 instead of relay 307 as in the case of the end of the first code.

Relay 309 operates; locks operated; and opens the code wire ground to prevent the generation of a third series of pulses.

Relays 314 and 315 return DR to its normal position and thereafter release.

*Receipt of code pulses*

Figure 6:
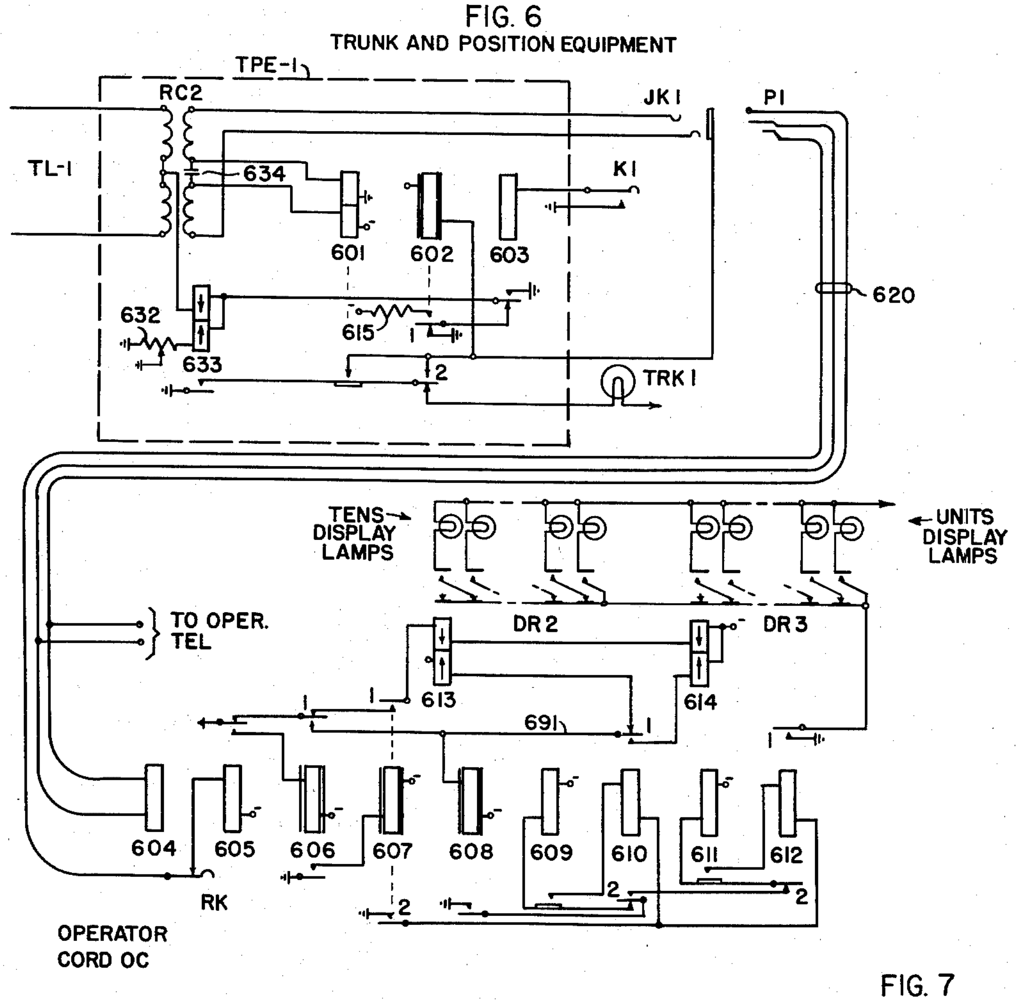

Referring now to Fig. 6 of the drawings, the six ground and battery pulses constituting the first digit of the assigned code and the five ground and battery pulses constituting the second digit cause relay 633 to restore and reoperate in accordance therewith. Contacts on relay 633 repeat such series of pulses over wire S of cord 620 to relay 605.

Relay 605 restores and reoperates in accordance with the repeated pulses to cause DR–2 to actuate its first six contact sets and to cause DR–3 to actuate its first five contact sets, the circuit for such registers being over wire 691. Relay 608 responds to the usual interdigit interval to operate relays 609 and 610 sequentially to transfer the dialing lead 691 from one digit register to the other.

On completion of the second digit, the restoration of relay 608 causes relays 611 and 612 to operate sequentially to thereafter energize the tens and units display lamps to provide a visual indication of the received code.

At such time, the operator may receive or transmit any desired messages over the called line. Having been informed of the identity of the called line, the secretarial operator may make a record of that identity on a suitable message sheet (not shown), while verbally answering the call appropriately, as by stating that number or the identity of the called person or organization, as desired.

*Rechecking the received code*

In the event the operator desires to check the received code, key RK is temporarily operated to extinguish the display lamps and return the cord OC to normal. This operation is followed by the temporary operation of key K1 which, by operating 603, temporarily replaces battery from resistor 615 with ground from contacts on relay 603. This ground appears on the line side of relay 333.

Relay 333 restores as both its differentially connected windings are energized. Contacts on relay 333 remove holding ground from the windings of relays 307, 308 and 309, permitting them to restore. When relay 307 restores, ground is removed from wire E2 of link 2 and relay 206 restores. Contacts on relay 206 restore the code relays that were operated for the second digit and operate the code relays corresponding to the first digit. At the same time, relay 309 recloses the energizing circuit for digit wire 6 (first digit) and the subscriber's code is re-sent in the manner previously described.

*Subscriber answer*

In the event the participating subscriber removes his handset while the answering-service operator is handling the call, relay 201 operates and restores relays 203, 204, and 205. Contacts on relay 203 restore relay 211 which opens the common link wires. At the same time, wire 268 is grounded, operating relay 208 and causing switch SW–200 to advance to its home position. At such time ground is removed from wire TST2 and relay 301 restores to thereby connect magnet MM of switch SW–300 to its homing bank. Switch SW–300 is returned to its normal position and the trunk equipment is thereafter cleared out. The participating subscriber may now converse with the calling party.

While I have described above the principles of my invention in connection with specific apparatus, it is to be clearly understood that this description is made only by way of example and not as a limitation to the scope of my invention.

I claim:

1. In a telephone system, calling and called lines, means for establishing a connection from any calling line to any called line, call-detectors and means for connecting them to respective ones of certain called lines, an operator's position, trunk lines extending between the operator's position and the call-detectors, means responsive to the establishment of a connection to any called line to which a call-detector is connected for signalling the called line and for operating the call-detector into an unanswered called condition, call-extending means for extending an operator-answer connection from the called line to the operator's position over an idle one of said trunk lines, control means for operating the last said means responsive to the last said call-detector being operated into its said unanswered called condition, the control means including timing means for introducing a predetermined delay time interval sufficient to permit the call to be answered normally on the called line before operating said call-extending means, answering means at the called line and at the operator's position for answering the established connection, and means controlled by the operation of the answering means on the signalled line during the said predetermined time interval for operating the call-detector into an unanswered called condition wherein the said extending means is disabled.

2. A telephone system according to claim 1, wherein the said means controlled by the operation of the answering means on the signalled line is effective, after a connection has been extended to the operator's position upon the lapse of said delay time interval, to operate the call-detector into the said answered called condition, means for clearing out the connection to the operator's position responsive to the call-detector being operated into its last said condition.

3. In a telephone system, calling and called lines, means for establishing a connection from any calling line to any called line, call-detectors and means for connecting them to respective ones of certain called lines, each call-detector including means for assigning a distinctive line-identifying code to the line to which the call-detector is connected, an operator's position, trunk lines extending between the operator's position and the call-detectors, means responsive to the establishment of a connection to any called line to which a call-detector is connected for signalling the called line and for operating the call-detector to connect the called line to the operator's position over an idle one of said trunk lines, answering means at the operator's position for answering the call on the called line over the last said trunk, means responsive thereto for transmitting a group of signals over the last said trunk to the operator's position corresponding to the identifying code assigned to the last said call-detector, means at the operator's position for registering the transmitted signals, and means controlled by the registering means for displaying the assigned distinctive line-identifying code to the operator at the said position.

4. In a telephone system according to claim 3, means at the operator's position for clearing out the said registering and display means while an answered said trunk connection exists thereto from a said called line, and means controlled from the operator's position for causing said transmitting means to repeat the said group of signals to reset the registering and display means.

5. In a telephone system, calling and called lines, means for establishing a connection from any calling line to any called line, a group of call-detectors and means for connecting them to respective ones of certain called lines, an operator's position and a group of trunk lines associated therewith, switching apparatus for interconnecting any call-detector with any trunk line, means responsive to the establishment of a connection to a called line to which a call-detector is connected from signalling the called line and for operating the connected call-detector, means in the operated call-detector for operating the switching apparatus to extend a branch connection from the operator's position to the called line over a path including the operated call-detector and a selected idle one of said trunk lines, means responsive to the said extension of a branch connection for signalling the operator's position, answering means at the called line and at the operator's position for answering the established connection, each call-detector including timing means for introducing a delay period following its said operation and preceding the said operation of the switching apparatus, said delay period being sufficient to permit normal answering to occur at the called line with which the detector is connected before the delay period ends, and means responsive to normal answering at the called line for nullifying the said means for operating the said switching apparatus.

6. In a telephone system according to claim 5, means responsive to delayed answering at a said called line from which a said branch connection has been extended for severing the branch connection forthwith.

References Cited in the file of this patent

UNITED STATES PATENTS

| | | |
|---|---|---|
| 2,168,883 | Peterson | Aug. 8, 1939 |
| 2,718,556 | Brunberg | Sept. 20, 1955 |
| 2,847,512 | Crabtree | Aug. 12, 1958 |